United States Patent [19]

Tomihashi et al.

[11] Patent Number: 5,700,861
[45] Date of Patent: Dec. 23, 1997

[54] FLUORORUBBER COATING COMPOSITION AND METHOD FOR MODIFYING SUBSTRATE SURFACE

[75] Inventors: Nobuyuki Tomihashi; Kiyotaro Terasaka, both of Osaka, Japan

[73] Assignee: Daikin Industries Ltd., Osaka, Japan

[21] Appl. No.: 522,338

[22] PCT Filed: Mar. 16, 1994

[86] PCT No.: PCT/JP94/00417

§ 371 Date: Sep. 14, 1995

§ 102(e) Date: Sep. 14, 1995

[87] PCT Pub. No.: WO94/21729

PCT Pub. Date: Sep. 29, 1994

[30] Foreign Application Priority Data

Mar. 17, 1993 [JP] Japan ................................. 5-056863

[51] Int. Cl.$^6$ ........................................................ C08F 8/18
[52] U.S. Cl. ........................ 524/344; 524/345; 524/346; 525/326.3; 525/359.3
[58] Field of Search ................... 525/359.7; 524/344, 524/345, 346

[56] References Cited

U.S. PATENT DOCUMENTS 4,894,418 1/1990 Strepparola et al. ................. 525/326.3
5,266,650 11/1993 Guerra et al. ........................ 525/326.3

*Primary Examiner*—Bernard Lipman
*Attorney, Agent, or Firm*—Birch, Stewart, Kolasch & Birch, LLP

[57] ABSTRACT

A fluororubber coating composition which contains (a) a fluororubber having a —$CH_2$— group in a backbone; (b) a fluoropolyether fluorooil having a functional group capable of chemically bonding to the fluororubber (a) upon heating; (c) a vulcanizing agent and optionally vulcanizing aid; and (d) a medium. When the composition is applied to a substrate and calcined, permanent non-tackiness can be imparted to the substrate surface without impairing the characteristics of the fluororubber, such as elasticity, and the heat and chemical resistance.

18 Claims, No Drawings

FLUORORUBBER COATING COMPOSITION AND METHOD FOR MODIFYING SUBSTRATE SURFACE

SPECIFICATION

1. Fields of the Invention

The present invention relates to a fluororubber coating composition and a method for modifying a surface of a substrate. Particularly, it relates to a fluororubber coating composition based on a fluororubber and a method for modifying a surface of a substrate by the use of said composition.

2. Related Art

A fluororubber having rubber-like elasticity and having excellent chemical resistance and thermal resistance is used in various fields. A surface of an article which is frequently contacted with a chemical substance, such as a fixing roller of a copy machine, is required to have high non-tackiness (namely, water-repellency and oil-repellency). Usual fluororubbers have insufficient non-tackiness. Therefore, the improvement of the non-tackiness is attempted.

For example, it is attempted that a fluororesin such as polytetrafluoroethylene (PTFE), a tetrafluoroethylene/perfluoroalkyl vinyl ether copolymer (PFA), a tetrafluoroethylene/hexafluoropropylene copolymer (FEP) is added to the fluororubber to improve the non-tackiness by the utilization of the non-tackiness of the fluororesin. However, the modified fluororubber has poor gloss, high grittiness and cracks due to the particle diameter and high melting point of the fluororesin. A fluororubber matrix may have deterioration of properties due to penetration of a liquid agent through the cracks.

There is a method for giving the non-tackiness in which usual unmodified fluorooil (or silicone oil) is added to the fluororubber to bleed the fluorooil on the matrix surface. In this case, since the fluorooil on the surface is gradually removed by the contact with a solvent solubilizing the fluorooil and other materials, the permanent effect cannot be expected.

Among the fluororubbers, there is a perfluororubber having the excellent non-tackiness. However, it is difficult to prepare a paint comprising the perfluororubber and to have the vulcanization by baking the paint.

SUMMARY OF THE INVENTION

An object of the present invention is to provide a fluororubber coating composition which can give a durable non-tackiness to a substrate without deteriorating the properties of the fluororubber such as elasticity, thermal resistance and chemical resistance.

Another object of the present invention is to provide a method for modifying a surface of a substrate by the use of the fluororubber coating composition.

According to a first aspect, the present invention provides a fluororubber coating composition which comprises (a) a fluororubber having a —$CH_2$— group in a backbone;

(b) a fluoropolyether fluorooil having a functional group capable of chemically bonding to the fluororubber (a) having the —$CH_2$— group in he backbone upon heating;

(c) a vulcanizing agent and optionally a vulcanizing aid; and (d) a medium.

The fluororubber coating composition is useful particularly as a paint.

According to a second aspect, the present invention provides a method for modifying a surface of a substrate which comprises coating the above composition on the substrate surface and calcining the composition. The method of the present invention can give a durable non-tackiness to the substrate surface.

DETAILED DESCRIPTION OF THE INVENTION

The fluororubber used in the composition of the present invention has the —$CH_2$— group in the backbone. The fluororubber used in the composition of the present invention may be a copolymer of at least one monomer selected from the group consisting of vinylidene fluoride, ethylene and propene (Group 1) with at least one monomer selected from the group consisting of tetrafluoroethylene, hexafluoropropene, a fluorine-containing vinyl ether, chlorotrifluoroethylene and pentafluoropropene (Group 2). The monomer of Group 1 gives the —$CH_2$— group in the backbone.

The fluorine-containing vinyl ether is, for example,

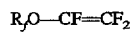

wherein $R_f$ is a $C_1$–$C_3$ fluoroalkyl group,

wherein $0 \leq n \leq 5$,

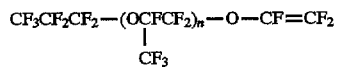

wherein $0 \leq n \leq 5$, and

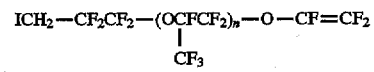

wherein $0 \leq n \leq 5$, and the fluorine-containing vinyl ether is not limited to these examples.

The molar ratio of the monomer of Group 1 to the monomer of Group 2 is preferably from 30:70 to 85:15. The molecular weight of the fluororubber is preferably from 5,000 to 200,000.

The composition of the present invention contains the fluoropolyether fluorooil having the functional group capable of chemically bonding to the fluororubber having the —$CH_2$— group in the backbone upon the heating. The backbone of fluoropolyether fluorooil has at least one repeating unit selected from the group consisting of

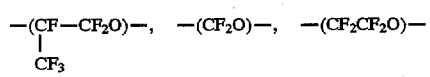

(I)

The total number of repeating units is from 1 to 1,000.

The functional group capable of chemically bonding to the fluororubber having the —$CH_2$— in the backbone upon the heating may be, for example, H, Cl, Br, I, $NR_1R_2$ (wherein each of $R_1$ and $R_2$ is independently H, an aryl group, a $C_1$–$C_{10}$ alkyl group, or a cycloalkyl group), SH, NCO, $NO_2$, COOH, $PO_2H$, $SO_3H$, OH, a glycidyl group or a hydroxyphenyl group. The functional group is present at molecular end or in a side chain of the fluorooil molecule.

When the fluorooil molecule has at least two functional groups capable of chemically bonding to the fluororubber (a), the vulcanization (cross-linking) of the fluororubber (a) is disadvantageously caused.

The above functional group is bonded to the backbone comprising fluoroether repeating unit of the formula (I), directly or through —$(CH_2)_n$—, —$(CF_2)_n$—, —$(CF_2O)_n$— or —$(CH_2O)_n$—
wherein $1 \leq n < 100$.

When the fluorooil having the functional group is heated to 150°–250° C., it reacts with and bonds to the fluororubber having the —$CH_2$— group in the backbone.

The fluoropolyether fluorooil (b) having the functional group is used in an amount of 0.1 to 50 parts by weight, preferably 1 to 10 parts by weight per 100 parts by weight of the fluororubber (a) having the —$CH_2$— group in the backbone. If the amount is smaller than 0.1 parts by weight, non-tackiness is insufficient. If the amount is larger than 50 parts by weight, the mixing with the fluororubber (a) is difficult so that the vulcanized material has poor properties of rubber and cannot be practically used.

The composition of the present invention contains the vulcanizing agent for fluororubber. The vulcanizing agent may be conventionally used one. Preferable examples of the vulcanizing agent are (1) an aliphatic polyamine such as triethylenetetramine, tetraethylenepentamine, ethylenediamine, trimethylenediamine, ethanolamine and 3,9-bis(3-aminopropyl)-2,4,8,10-tetraoxa-2-spiro[5.5]undecane and salts thereof, an aromatic polyamine such as diaminodiphenylmethane, xylylenediamine, phenylenediamine and diaminodiphenylsulfone and salts thereof, a polyamine compound such as polyamide amine and modified polyamine;

(2) a phenol derivative such as bisphenol AF and hydroquinone, a polyhydroxy compound having an enol-type hydroxyl group such as a phenol resin, metal salts thereof, a polyol compound such as $R_f(CH_2OH)_2$ (wherein $R_f$ is a perfluoroalkyl group); and (3) a polythiol compound such as triazinethiol, 1,6-hexanedithiol, 4,4'-dimethylcaptodiphenyl and 1,5-naphthalenedithiol.

In addition, a commercially available vulcanizing agent for fluororubber can be used. When the medium is an organic solvent, the vulcanizing agent preferably dissolves in the organic solvent. When the medium is water, the vulcanizing agent preferably dissolves in water.

The vulcanizing agent is used in an amount of 0.1 to 20 parts by weight, preferably 0.5 to 5 parts by weight per 100 parts by weight of the fluororubber (a).

The vulcanizing aid is optionally used to accelerate the vulcanization. Non-limiting examples of the vulcanizing aid are a quaternary ammonium salt such as DBU-b (diazabicycloundecenebenzyl chloride salt), a tertiary amine such as DABCO (diazabicyclooctane) and a quaternary phosphonium salt such as triphenylphosphinebenzyl chloride salt.

The vulcanizing aid is used in an amount of 0 to 10 parts by weight, preferably 0.1 to 5 parts by weight per 100 parts by weight of fluororubber (a). When the medium is an organic solvent, the vulcanizing aid preferably dissolves in the organic solvent. When the medium is water, the vulcanizing aid preferably dissolves in water.

In the composition of the present invention, the medium is an organic. solvent and/or water. In the context of the present specification, the medium means a material which dissolves or disperses the other components of the composition.

Non-limiting specific examples of the organic solvent are ketones such as methyl ethyl ketone and methyl isobutyl ketone, acetate esters such as butyl acetate, ethers such as diethyleneglycoldimethyl ether, hydrocarbons such as toluene and xylene, and amides such as N,N-dimethylacetamide and N-methyl-2-pyrrolidone. The organic solvent is used in an amount of 40 to 90% by weight based on the total amount of the coating composition.

When water is used as the medium, a dispersant is used to disperse the fluororubber, fluorooil and the like in water. Non-limiting specific examples of the dispersant are an anion surfactant such as lauryl sulfate salt, perfluoroalkyl carboxylate salt and ω-hydroperfluoroalkyl carboxylate salt; a nonionic surfactant such as a polyethylene glycol derivative and a polyethylene glycol/polypropylene glycol derivative; a resinous dispersant such as alkylpolyethyleneglycol ether, alkylphenylpolyethyleneglycol ether, alkylpolyethyleneglycol ester, an ethyleneglycol/propyleneglycol copolymer and a polyethyleneglycoldialkyl ester.

Water is used in an amount of 30 to 90% by weight based on the total amount of the coating composition. The dispersant is used in an amount of 0.1 to 10% by weight based on the total amount of the coating composition.

In addition to the above ingredients, the composition of the present invention optionally contains an additive for fluororubber paint, such as a filler, a colorant, a stabilizing agent, an acid acceptor and the like.

Non-limiting specific examples of the filler are carbon black, white carbon, zinc oxide, barium sulfate, calcium carbonate and talc. The filler is used in an amount of 0 to 200 parts by weight per 100 parts by weight of the fluororubber (a).

Non-limiting specific examples of the colorant are an inorganic pigment such as titanium oxide, red iron oxide and composite inorganic oxide; and an organic pigment such as a phthalocyanine pigment and a perylene pigment. The colorant is used in an amount of at most 20 parts by weight per 100 parts by weight of the fluororubber (a).

The stabilizing agent is added to prevent a reaction such as a vulcanization during the storage of the composition. Non-limiting specific examples of the stabilizing agent are an organic acid such as acetic acid, and an organic acid anhydride such as acetic anhydride.

The acid acceptor may be added to accept hydrofluoric acid generated during the vulcanization reaction. Non-limiting specific examples of the acid acceptor are magnesium oxide, calcium hydroxide and hydrotalcite.

When the coating composition of the present invention is used as the paint, a tackifier may be added, if it is necessary to increase the affinity for the substrate or if it is necessary to give the affinity for a primer coated on the substrate. When the substrate is a metal or glass, a coupling agent such as silane coupling agent, a titanium coupling agent and an aluminum coupling agent may be used. Among the vulcanizing agents, the vulcanizing agent having the adhesion property such as polyamideamine and a phenol resin can act as the tackifier depending on the use amount thereof.

The addition amount of the tackifier is at most 25 parts by weight per 100 parts by weight of the fluororubber (a). When the amount is larger than 25 parts by weight, the non-tackiness of the vulcanized material is deteriorated.

The composition of the present invention may be prepared, stored and used in the form of a one-component liquid comprising all ingredients. In order to improve the storage stability, two-component type composition may be prepared and stored and the two liquids may be mixed before the usage. In the case of the two-component type composition, a liquid comprising the vulcanizing agent, the optional vulcanizing aid and tackifier, and a part of the medium (hereinafter referred to as "liquid B") and a liquid comprising the other ingredients, namely, the fluororubber, the fluorooil, the optional additive for fluororubber paint, and the balance of the medium (hereinafter referred to as "liquid A") are separately prepared and then are mixed before the usage. In view of the storage stability, the two-component type is preferable. In the case of the one-component type, the stabilizing agent is preferably used.

The method for preparing the composition of the present invention is illustrated. In the case of the two-component type comprising the organic solvent as the medium, the fluororubber, the fluorooil, and the optional filler, acid acceptor and colorant are mixed in an open roll or a kneader to prepare a compound. The compound is dissolved or dispersed in the organic solvent, and the stabilizing agent is optionally added to prepare the Liquid A. On the other hand, the vulcanizing agent, and the optional vulcanizing aid and tackifier are dissolved in the organic solvent to prepare the liquid B. In the case of the one-component type, the liquid A is previously mixed with the liquid B, or all ingredients are mixed to prepare one-component type.

In the case of the two-component type comprising water as the medium, a concentrated liquid of the fluororubber in which the fluororubber is dispersed in water by the use of the dispersant. A fluororubber latex as such may be used. The fluorooil is emulsified by a stirrer by the use of the dispersant. The optionally used filler, colorant and acid acceptor are previously dispersed by the use of the dispersant. These liquids are mixed, the stabilizing agent is optionally added, and water is added to give a suitable concentration and viscosity so as to prepare the liquid A. On the other hand, separately, a solution of the vulcanizing agent and vulcanizing aid in water (when the vulcanizing agent and the vulcanizing aid are water-soluble), or a dispersion of the vulcanizing agent and vulcanizing aid in water (when the vulcanizing agent and the vulcanizing aid are water-nonsoluble) is prepared and the tackifier is optionally added to prepare the liquid B. In the case of the one-component type, the liquid A is previously mixed with the liquid B, or all ingredients are mixed to prepare the one-component type.

According to other aspect, the present invention provides a method for modifying a surface of a substrate, comprising coating the coating composition on the substrate surface and calcining the composition. Specific examples of the substrate are a metal such as iron, SUS, copper and aluminum, a glass, a resin molded article, a rubber molded article, a glass woven fabric, and a woven fabric comprising natural or synthetic fibers. Firstly the substrate is sufficiently degreased and washed, a primer is optionally coated on the substrate depending on the properties of the substrate, and then coating composition of the present invention is coated by the procedure such as a spraying, a dipping, a flow and a screen coating. In the case of the two-component type, preferably, both liquids are mixed immediately before the coating, to give the coating composition. After the coating, a predrying is conducted at a temperature of about 100° C. to evaporate water or the organic solvent. Then, a calcination is conducted at a temperature of 150° to 250° C. for 10 to 120 minutes. During the calcination, the fluororubber is vulcanized and the fluororubber is bonded to the fluorooil. In the present invention, the term "calcination" means the heating operation achieving these objects.

The coating composition of the present invention can be used to improve the surface of the substrate in the field which requires high thermal resistance, solvent resistance, chemical resistance and non-tackiness. The coating composition can be used in a fixing roller of a copy machine; a conveyor belt; a seat and belt comprising an impregnated fabric; a surface improvement of various sealing materials such as an O-ring, diaphragm, chemically resistant tube, fuel hose, engine head gasket comprising usual fluororubber; and a precoated metal to prevent the adhesion of the fluororubber.

PREFERRED EMBODIMENTS OF THE INVENTION

Example 1

To a latex (Daiel Latex® GL-152A manufactured by Daikin Industries Ltd., concentration of fluororubber: 43%) of a fluororubber (a vinylidene fluoride/hexafluoropropene/tetrafluoroethylene copolymer) (100 parts by weight), was added a liquid in which a fluorooil having a molecular end modified to a —$CH_2OH$ group (Demnum SA manufactured by Daikin Industries Ltd.) (0.43 parts by weight) was emulsified in water (0.69 parts by weight) by the use of a surfactant [Nonion HS-208 (manufactured by Nippon Oil & Fats Co. Ltd.)/Nonion NS-204.5 (manufactured by Nippon Oil & Fats Co. Ltd.)=1/1 mixture] (0.17 parts by weight) to prepare a liquid A. On the other hand, a mixture of a polyamine vulcanizing agent (Epomate F-100 manufactured by Yuka Shell CO. Ltd.) and a silane coupling agent (manufactured by Nippon Uniker Co. Ltd.) in weight ratio of 1/4 (30 parts by weight) was dissolved in water (70 parts by weight) to give a liquid B. The liquid A was mixed with the liquid B in a weight ratio that the amount of the liquid B was 15 parts by weight per 100 parts by weight of the fluororubber in the liquid A. The mixture liquid was spray coated on a silicone rubber substrate. The substrate was predried at 80°–100° C., and calcined in an electrical oven at 200° C. for 60 minutes to give a coated sample. The coated sample was cooled in air, washed sufficiently with fluorinated hydrocarbon R-113 and air-dried. The appearance of the resultant sample was visually observed, and a contact angle (to water and to n-cetane) was measured. The results are shown in Table 1.

Examples 2 to 4

Daiel Latex GL-152A used in Example 1 was used and the amount of mixed Demnum SA was 2, 5 and 10 parts by weight per 100 parts by weight of the polymeric component in the latex to give a liquid A. The same liquid B as in Example 1 was mixed with the liquid A in the same manner as in Example 1. The coated sample was prepared and the appearance observation and contact angle measurement of the coated sample were conducted. The results are shown in Table 1.

Comparative Example 1

In the same manner as in Example 1, the preparation of a coating composition, the preparation of a coated sample, and the appearance observation and contact angle measurement of the coated sample were conducted except that no fluorooil was used. The results are shown in Table 1.

Comparative Example 2

In the same manner as in Example 2, the preparation of a coating composition, the preparation of a coated sample, and the appearance observation and contact angle measurement of the coated sample were conducted except that a fluorooil having no functional group (Demnum S-45 manufactured by Daikin Industries Ltd.) was used instead of the fluorooil having the functional group at the molecular end. The results are shown in Table 1.

Comparative Example 3

In Example 1, a fluororesin of a tetrafluoroethylene/hexafluoropropylene copolymer (FEP) (Neoflon Dispersion ND-1 manufactured by Daikin Industries Ltd., content of FEP: 52% by weight) was used instead of the fluorooil. Namely, ND-1 (82.7 parts by weight) was added to and mixed with GL-152A (100 parts by weight) to give a liquid A (This is a product having a color different from GLS-213 manufactured by Daikin Industries Ltd.). In the same manner as in Example 1, the mixing of the liquid A with the liquid B, the preparation of a coated sample, and the appearance observation and contact angle measurement of the coated sample were conducted. The results are shown in Table 1.

Example 5

Daiel Latex GL-152A used in Example 1 was used and a fluorooil having a molecular end modified to a -COOH group (Demnum SH manufactured by Daikin Industries Ltd.) was added in an amount that the fluorooil was 2 parts by weight per 100 parts by weight of the polymeric component in the latex in the same manner as in Example I to give a liquid A. The same liquid B as in Example 1 was used and the mixing, the coating, the drying and the calcination (at 200° C. for 30 minutes) were conducted and properties were measured. The results are shown in Table 1.

TABLE 1

| Additive (fluorooil) | Addition amount *1 | Appearance *2 | Contact angle (degree) Water | Contact angle (degree) n-Cetane |
|---|---|---|---|---|
| Ex. 1 | Demnum SA | 1 | ○ | 113 | 59 |
| Ex. 2 | Demnum SA | 2 | ○ | 113 | 62 |
| Ex. 3 | Demnum SA | 5 | Δ | 111 | 60 |
| Ex. 4 | Demnum SA | 10 | X | 110 | 63 |
| Ex. 5 | Demnum SH | 2 | ○ | 110 | 61 |
| Com. Ex. 1 | — | — | ○○ | 104 | 39 |
| Com. Ex. 2 | Demnum S-45 | 2 | Δ | 103 | 49 |
| Com. Ex. 3 | FEP | 100 | Δ | 111 | 45 |

Note:
*1: Parts by weight per 100 parts by weight of fluororubber
*2: Evaluation of appearance
○○: Glossy, excellent
○: Almost good
Δ: Some protrusions or grittiness on surface
X: Many protrusions on surface As explained above, the use of the fluororubber coating composition of the present invention gives permanent non-tackiness (water- and oil-repellency) to the substrate with maintaining the properties of the fluororubber.

What is claimed is:

1. A fluororubber coating composition which comprises
   (a) a fluororubber having a —$CH_2$— group in a backbone;
   (b) a fluoropolyether fluorooil having a functional group capable of chemically bonding to the fluororubber (a) having the —$CH_2$— group in the backbone upon heating;
   (c) a vulcanizing agent and optionally a vulcanizing aid; and
   (d) a medium which is water.

2. The fluororubber coating composition according to claim 1, wherein the fluororubber (a) having the —$CH_2$— group I in the backbone is a copolymer of at least one monomer selected from the group consisting of vinylidene fluoride, ethylene and propene with at least one monomer selected from the group II consisting of tetrafluoroethylene, hexafluoropropene, a fluorine-containing vinyl ether, chlorotrifluoroethylene and pentafluoropropene.

3. The fluororubber coating composition according to claim 1, wherein the functional group possessed by the fluoropolyether fluorooil (b) is H, Cl, Br, I, $NR_1R_2$ (wherein each of $R_1$ and $R_2$ is independently H, an aryl group, a $C_1$-$C_{10}$ alkyl group, or a cycloalkyl group), SH, NCO, $NO_2$, COOH, $PO_2H$, $SO_3H$, OH, a glycidyl group or a hydroxyphenyl group.

4. The fluororubber coating composition according to claim 1, wherein a dispersant for dispersing the fluororubber and/or fluorooil in the medium is further added.

5. The fluororubber coating composition according to claim 1, wherein a filler, a colorant, a stabilizing agent, an acid acceptor and/or a tackifier is further added.

6. A method for preparing the fluororubber coating composition according to claim 1, which comprises mixing a liquid comprising the fluororubber (a), the fluoropolyether fluorooil (b) and the medium (d) with a liquid comprising the vulcanizing agent and optional vulcanizing aid (c) and the medium (d) immediately before the composition is used.

7. A method for modifying a surface of a substrate which comprises coating the composition according to claim 1 on the substrate surface and calcining the composition.

8. The method according to claim 7, wherein the substrate is a metal, a glass, a resin, a rubber or a fabric.

9. The method according to claim 7, wherein the calcination is conducted at a temperature of 150° to 250° C.

10. A fluororubber coating composition which comprises
    (a) a fluororubber having a —$CH_2$— group in its polymer backbone;
    (b) A fluoropolyether fluorooil having one functional group selected from the group consisting of H, Cl, Br, I, $NR_1R_2$, SH, NCO, $NO_2$, COOH, $PO_2H$, $SO_3H$, OH, a glycidyl group and a hydroxyphenyl group capable of chemically bonding to the fluororubber upon heating, wherein each of $R_1$ and $R_2$ is independently H, an aryl group, a $C_1$-$C_{10}$ alkyl group, or a cycloalkyl group;
    (c) a vulcanizing agent and optionally a vulcanizing aid; and
    (d) a medium which is water.

11. The fluororubber coating composition according to claim 2, wherein said fluorine-containing vinyl ether is a compound of one of the following formulae:

$R_fO$—CF=$CF_2$, wherein $R_f$ is a $C_1$-$C_3$ fluoroalkyl group;

$CF_3CF_2CF_2$—$(OCF_2CF_2CF_2)_n$—O—CF=$CF_2$, wherein $0 \leq n \leq 5$;

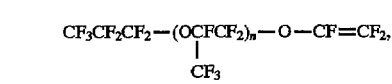

wherein $0 \leq n \leq 5$; or

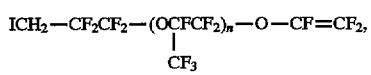

wherein $0 \leq n \leq 5$.

12. The fluororubber coating composition according to claim 2, wherein the molar ratio of the monomer of group I to the monomer of group II is from 30:70 to 85:15.

13. The fluororubber coating composition according to claim 1, wherein the fluoropolyether fluorooil has at least one repeating unit selected from the group consisting of

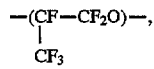

—(CF$_2$O)—,

—(CF$_2$CF$_2$O)— and —(CF$_2$CF$_2$CF$_2$O)—, wherein the total number of repeating units is from 1 to 1000, in the backbone thereof.

14. The fluororubber coating composition according to claim 1, wherein the fluoropolyether fluorooil has only one functional group capable of chemically bonding to the fluororubber.

15. The fluororubber coating composition according to claim 13, wherein said functional group is bonded to the backbone repeating unit either directly or through a moiety of the formula —(CH$_2$)$_n$—, —(CF$_2$)$_n$—, —(CF$_2$O)$_n$— or —(CH$_2$O)$_n$—, wherein $1 \leq n \leq 100$.

16. The fluororubber coating composition according to claim 1, wherein the fluoropolyether fluorooil is used in an amount of 0.1 to 50 parts by weight per 100 parts by weight of the fluororubber.

17. The fluororubber coating composition according to claim 16, wherein the fluoropolyether fluorooil is used in an amount of 1 to 10 parts by weight per 100 parts by weight of the fluororubber.

18. A fluororubber coating composition which comprises (a) a fluororubber having a —CH$_2$— group in its polymer backbone;

(b) A fluoropolyether fluorooil having a functional group selected from the group consisting of H, Cl, Br, I, NR$_1$R$_2$, SH, NCO, NO$_2$, COOH, PO$_2$H, SO$_3$H, a glycidyl group and a hydroxyphenyl group capable of chemically bonding to the fluororubber upon heating, wherein each of R$_1$ and R$_2$ is independently H, an aryl group, a C$_1$–C$_{10}$ alkyl group, or a cycloalkyl group;

(c) a vulcanizing agent and optionally a vulcanizing aid; and (d) a medium which is water.

* * * * *